(12) United States Patent
Roberts et al.

(10) Patent No.: US 8,668,092 B2
(45) Date of Patent: Mar. 11, 2014

(54) SYSTEM AND METHOD FOR UNIFORMLY DISTRIBUTING A FLUID THROUGH A FILTER BED IN A FILTER

(75) Inventors: R. Lee Roberts, Rose Valley, PA (US); Mark Kevin Addison, Bear, DE (US)

(73) Assignee: Roberts Marketing DE, Inc., Wilmington, DE (US)

( * ) Notice: Subject to any disclaimer, the term of this patent is extended or adjusted under 35 U.S.C. 154(b) by 338 days.

(21) Appl. No.: 12/929,416

(22) Filed: Jan. 21, 2011

(65) Prior Publication Data

US 2011/0226687 A1 Sep. 22, 2011

Related U.S. Application Data

(63) Continuation-in-part of application No. 11/606,012, filed on Nov. 30, 2006, now Pat. No. 7,922,903, which is a continuation-in-part of application No. 11/588,210, filed on Oct. 27, 2006, now Pat. No. 7,736,506.

(51) Int. Cl.
  *B01D 24/40* (2006.01)
  *B01D 21/34* (2006.01)
  *B01D 29/90* (2006.01)

(52) U.S. Cl.
  USPC .......................... 210/456; 210/418; 210/154

(58) Field of Classification Search
  None
  See application file for complete search history.

(56) References Cited

U.S. PATENT DOCUMENTS

| | | | | |
|---|---|---|---|---|
| 3,456,804 | A * | 7/1969 | McGivern | 210/292 |
| 5,019,259 | A * | 5/1991 | Hambley | 210/274 |
| 2003/0047502 | A1 * | 3/2003 | Roberts et al. | 210/293 |

* cited by examiner

*Primary Examiner* — Katherine Zalasky
(74) *Attorney, Agent, or Firm* — Merek, Blackmon & Voorhees, LLC

(57) ABSTRACT

A system and method for uniformly distributing fluids (e.g., washing and in-service) through a filter bed of a filter. The system and method of the present invention can be used with any type of filter that uses media to remove impurities from a fluid. The filter bed can include one or more layers of media. The media can be natural (e.g., sand, gravel, anthracite, etc.) or can be fabricated (e.g., plastic). The filter media can be supported by one or more layers of gravel. Alternatively, the filter media can be supported by a porous plate or other support designed to replace the gravel layers. The present invention includes a system having one or more distribution members configured to uniformly distribute a fluid through a filter bed of a filter. Preferably, the one or more distribution members can be readily installed by relatively unskilled labor in both existing filters and new filters. In a preferred embodiment, the one or more distribution members are configured to extend into at least a portion of an underdrain from above the underdrain. In retrofit applications, the preferred design of the one or more distribution members is such that no significant alteration of the distribution chamber, underdrain or fluid velocity is necessary.

27 Claims, 11 Drawing Sheets

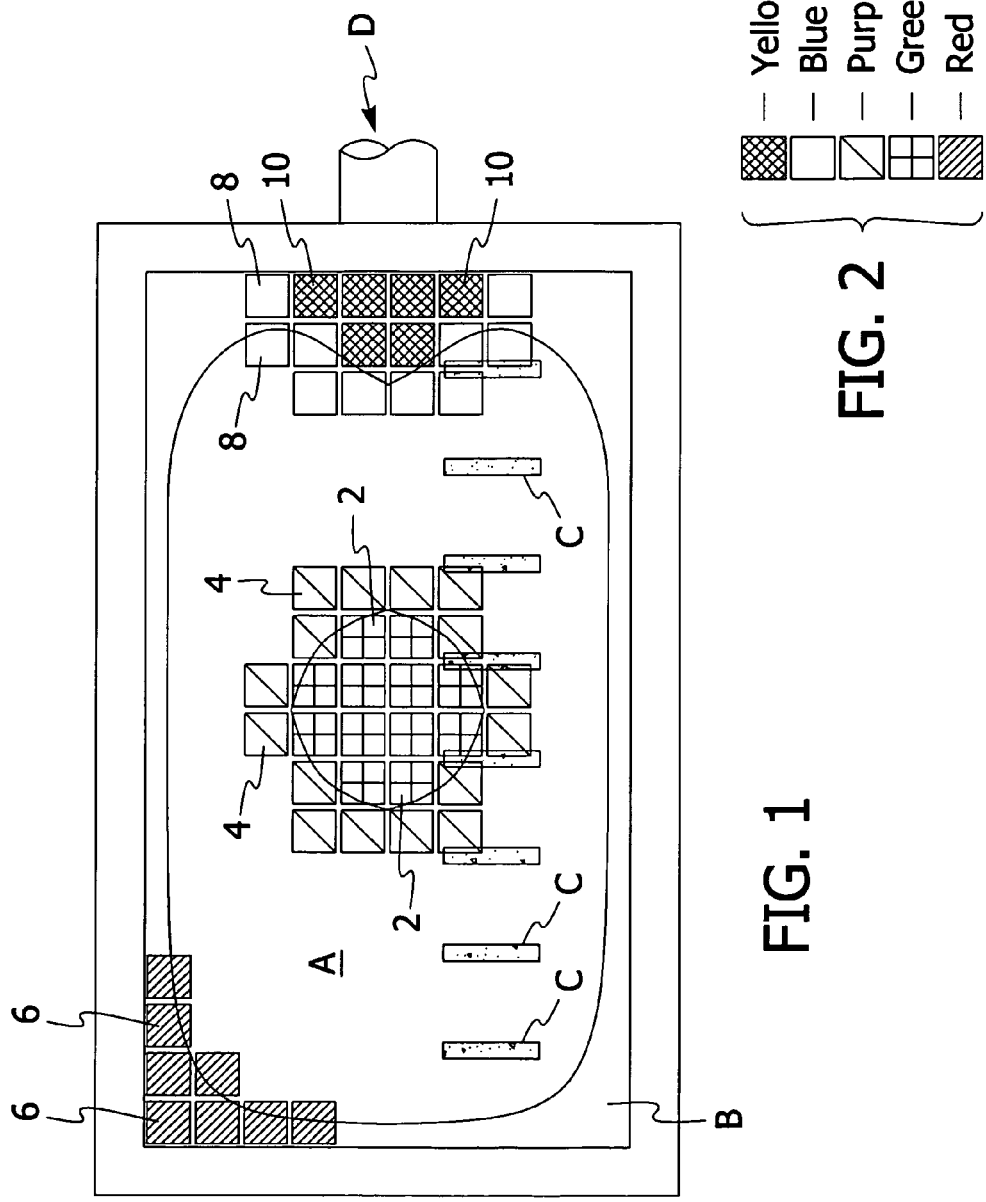

SYSTEM AND METHOD FOR UNIFORMLY DISTRIBUTING A FLUID THROUGH A FILTER BED IN A FILTER

RELATED APPLICATION

The subject patent application is a continuation-in-part of U.S. patent application Ser. No. 11/606,012 filed on Nov. 30, 2006, now U.S. Pat. No. 7,922,903, the entire contents of which are incorporated herein by reference, which is a continuation-in-part of U.S. patent application Ser. No. 11/588,210 filed on Oct. 27, 2006, now U.S. Pat. No. 7,736,506, the entire contents of which are incorporated herein by reference.

FIELD OF THE INVENTION

The present invention is directed to a filter system in which one or more fluids pass through a filter bed at various times (e.g., a washing mode and/or a filtration mode). More specifically, the present invention is directed to a system and method for uniformly distributing one or more fluids (e.g., washing and/or in-service) through a filter bed in a filter. The fluids may include a liquid, a gas or a combination of a liquid and a gas. Where a combination of a liquid and gas is used, the liquid and gas can be directed through the filter bed simultaneously or separately. The present invention can be used in all types of filters including but not limited to downflow polishing filters, upflow polishing filters, upflow clarifiers/roughing filters, downflow clarifiers/roughing filters, bi-flow polishing filters or bi-flow roughing filters, etc. Further, the present invention can be used in existing filters or new filters. The present invention can be used in both water and wastewater applications.

BACKGROUND OF THE INVENTION

Filter beds formed from one or more layers of filter media have been employed in a variety of known filters for filtering water or wastewater to remove impurities from liquids. For example, filter beds of granular media have been used in upflow filters, downflow filters as well as other types of filters including bi-flow filters. After the filter has been operating for a while, it is necessary to wash the filter bed to remove the impurities trapped in the filter bed during the filtration mode. Various methods have been used to wash the filter bed including but not limited to the steps of: (i) liquid only wash; (ii) air only wash; (iii) liquid and air concurrently; (iv) liquid only followed by air only; (v) air only followed by liquid only; and, (vi) liquid and air concurrently followed by liquid only.

It is important that the washing fluid is thoroughly distributed through the filter bed during the washing mode in order to remove an adequate amount of the impurities trapped in the filter bed during operation of the filter in the filtration mode. It is similarly important to uniformly distribute influent through the filter bed in-service fluids during the filtration mode. Various underdrains systems have been used in an attempt to distribute fluids uniformly throughout the filter bed.

Filters having a granular media filter bed above plenum style underdrains (e.g., Wheeler Bottoms, nozzle bottoms, strainers, Hydrocones or other similar underdrain types) are subject to maldistribution of the washing fluid during washing of the filter bed.

Maldistribution is often caused by pressure variations in the plenum induced by velocity gradients, friction loss, turbulence, and recirculation zones. The geometry of the plenum, the size and location of the backwash inlet, and the presence of piers or other elements that support the plenum style underdrain influence the hydraulic characteristics mentioned above. The plenum style underdrain typically uses fluid distributors (e.g., nozzles, strainers, Hyrdocones, inverted pyramidal depressions, etc.) that have identical hydraulic characteristics throughout the filter. Therefore, these types of underdrains cannot compensate for pressure variances in the plenum resulting in maldistribution of the washing fluid or influent in those instances where the washing fluid and/or influent passes from the plenum through the underdrain prior to entering the filter bed.

OBJECTS AND SUMMARY OF THE INVENTION

An object of a preferred embodiment of the present invention is to provide a novel and unobvious system and method for distributing a fluid (e.g., washing and/or in-service) uniformly through a filter bed in a filter.

Another object of a preferred embodiment of the present invention is to provide one or more distribution members that can be readily retrofitted into an existing filter system to assist in the uniform distribution of fluids through a filter bed of a filter.

A further object of a preferred embodiment of the present invention is to provide one or more distribution members having identifying indicia that readily identify to an individual where the one or more distribution members are to located in the filter to reduce and/or eliminate maldistribution of a fluid through a granular media filter bed.

Yet still a further object of a preferred embodiment of the present invention is to provide one or more distribution members that can readily compensate for pressure differences in a plenum style underdrain.

Still another object of a preferred embodiment of the present invention is to provide a system and method that readily overcomes maldistribution of fluids through a filter bed without reducing the velocity of the fluid introduced into the distribution chamber.

Still a further object of a preferred embodiment of the present invention is to provide a system and method that readily overcomes maldistribution of fluids without any significant alteration to the distribution chamber and/or the underdrain.

Another object of a preferred embodiment of the present invention is to provide a system for overcoming maldistribution of fluids passing through a filter bed that can be readily and inexpensively installed in an existing filter or a new filter.

A further object of a preferred embodiment of the present invention is to provide a system including one or more distribution members for compensating for pressure variances in a fluid distribution chamber operably associated with an underdrain where the one or more distribution members can be inserted directly into the underdrain from above the underdrain.

Still a further object of a preferred embodiment of the present invention is to provide one or more distribution members for compensating for pressure variances in a fluid distribution chamber operably associated with an underdrain where at least one hydraulic characteristic of the one or more distribution members can be adjusted.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for filtering water or wastewater including an underdrain for directing fluids into a filter bed. A first distribution member is operably associated with the underdrain through which one or more fluids pass in route to the filter bed. The first distribution member has a first hydraulic characteristic. The first distribution member includes identifying indicia corresponding to the first hydraulic characteristic to identify to an individual a first operating location for the first distribution member. A second distribution member is operably associated with the underdrain through which one or more fluids pass in route to the filter bed. The second distribution member has a second hydraulic characteristic that is different from the first hydraulic characteristic. The second distribution member has a second identifying indicia for identifying to an individual a second operating location for the second distribution. The first identifying indicia is different from the second identifying indicia and the first operating location is different from the second operating location.

Another embodiment of the present invention is directed to an apparatus for filtering water or wastewater including an underdrain for supporting a filter bed having at least one layer of filter media. A plurality of distribution members are operably associated with the underdrain. Each of the plurality of distribution members are configured to permit a fluid to pass therethrough in route to the filter bed. Each of the plurality of distribution members has a different hydraulic characteristic for minimizing maldistribution of a fluid through the filter bed. A plenum operably associated with the underdrain. The plenum is configured to direct a fluid into each of the plurality of distribution members.

A further embodiment of the present invention is directed to an apparatus for filtering water or wastewater including a fluid distribution chamber for receiving and distributing one or more fluids. An underdrain is operably associated with the fluid distribution chamber for directing a washing liquid from the fluid distribution chamber into a filter bed. The underdrain includes a plurality of fluid passageways through which the washing liquid from the fluid distribution chamber passes in route to the filter bed. A plurality of inserts, each of which is configured to be inserted into at least a portion of one of the plurality of fluid passageways. Each of the plurality of inserts has a control orifice through which the washing liquid from the fluid distribution chamber passes in route to the filter bed. At least one of the plurality of inserts has a control orifice of a size different from a control orifice of at least one other of the plurality of inserts to reduce maldistribution of the washing liquid during washing of the filter bed.

Still another embodiment of the present invention is directed to a method of reducing maldistribution of a fluid through a filter bed in a filter including the steps of: (a) performing an analysis to determine where each of a plurality of distribution members should be located in an underdrain of a filter to reduce maldistribution of a fluid passing through a filter bed; (b) providing an identifying indicia scheme having a plurality of identifying indicia where each of the plurality of identifying indicia represents a characteristic of a given distribution member that can be used to determine where the given distribution member is to be positioned based on the performing step; and, (c) providing a plurality of distribution members with each of said plurality of distribution members having the identifying indicia operably associated therewith corresponding to the identifying indicia scheme so that an individual can readily determine where in a filter each of the plurality of distribution members are to be positioned in the filter based on the performing step.

Yet still another embodiment of the present invention is directed to an apparatus for filtering water or wastewater including an underdrain for supporting a granular media filter bed. A first set of distribution members are operably associated with the underdrain. The first set of distribution members include at least two distribution members. Each of the distribution members in the first set of distribution members has a first hydraulic characteristic. A second set of distribution members operably associated with the underdrain. The second set of distribution members includes at least two distribution members. Each of the distribution members in the second set of distribution members has a second hydraulic characteristic. A plenum is operably associated with the underdrain. The plenum is configured to direct a fluid into each of the distribution members in the first set of distribution members and the second set of distribution members. The second hydraulic characteristic is different from the first hydraulic characteristic to compensate for pressure differences in the plenum adjacent the first set of distribution members and the second set of distribution members.

Still yet a further embodiment of the present invention is directed to a kit for reducing maldistribution of a fluid through a filter bed of an existing filter where the filter bed is supported above a plenum by an underdrain. The kit includes a first set of inserts each of which has a first hydraulic characteristic. A second set of inserts each of which has a second hydraulic characteristic. The second hydraulic characteristic is different from the first hydraulic characteristic to compensate for pressure differences in the plenum.

Another embodiment of the present invention is directed to a system for use with a filter having a filter bed that is periodically subjected to fluids including a liquid, a gas and/or a combination of liquid and gas. The system includes a distribution chamber for receiving and distributing one or more fluids. The distribution chamber includes an inlet for receiving one or more fluids. An underdrain supports a filter bed having at least one layer of filter media. The underdrain includes at least one opening for receiving one or more fluids from the distribution chamber. A distribution member is fixed relative to the underdrain such that the distribution member does not move relative to the underdrain. The distribution member is configured to vary a hydraulic characteristic of the opening in the underdrain to compensate for pressure variances in the distribution chamber.

Still another embodiment of the present inventions, is directed to an apparatus for reducing maldistribution of a fluid through a filter bed in a filter system having an underdrain disposed below the filter bed and a fluid distribution chamber operably associated with the underdrain for directing a fluid through the underdrain. The apparatus includes a first distribution member operably associated with the underdrain through which one or more fluids pass in route to the filter bed. The first distribution member is adjustable so that one or more hydraulic characteristics of the first distribution member can be adjusted without replacing the first distribution member to compensate for pressure variances in the fluid distribution chamber to reduce or eliminate maldistribution.

BRIEF DESCRIPTION OF THE DRAWINGS

FIG. 1 is a schematic shown in plan view of a Wheeler bottom type filter with a plurality of distribution members formed in accordance with a preferred embodiment of the present invention. The different lining of distribution members in this figure represents different colors.

FIG. 2 is a legend identifying the colors represented by the different lining of the distribution members illustrated in FIG. 1.

DETAILED DESCRIPTION OF THE PREFERRED EMBODIMENTS OF THE INVENTION

Figure 3:
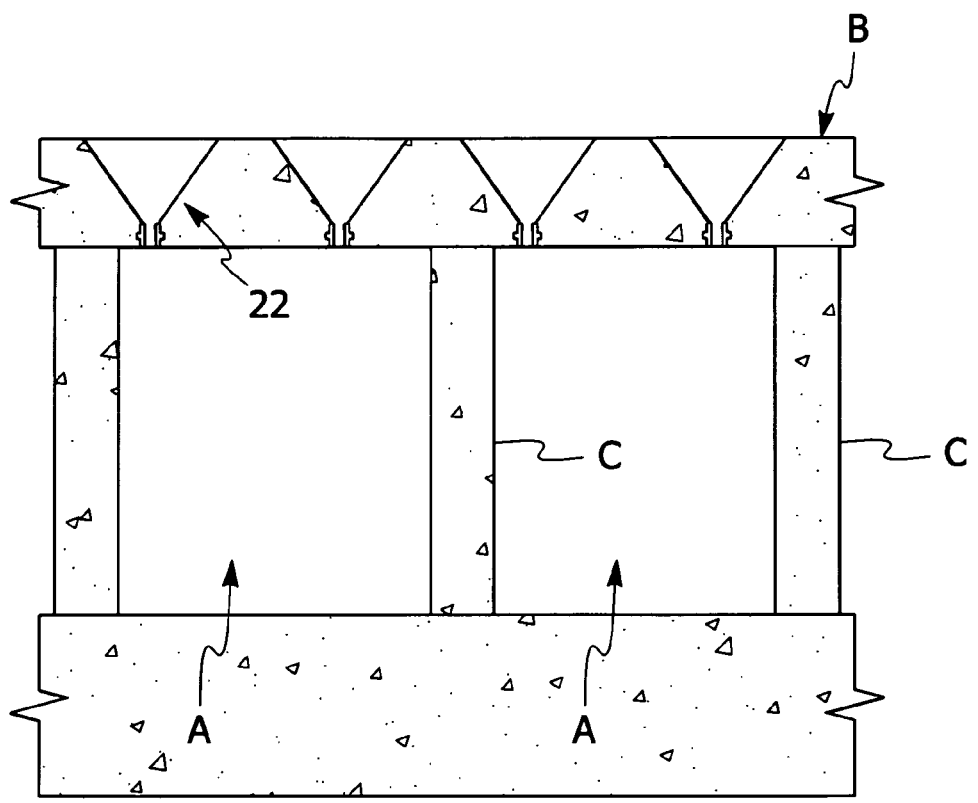
FIG. 3 is a fragmentary cross-sectional view of a portion of the Wheeler bottom type underdrain.

The preferred forms of the invention will now be described with reference to FIGS. 1 to 22. The appended claims are not limited to the preferred forms and no term and/or phrase used herein is to be given a meaning other than its ordinary meaning unless it is expressly stated otherwise. The term "plenum" as used herein refers to a chamber below a filter bed where the chamber extends below substantially the entirety of the filter bed. By way of example only, chambers that extend below only a minor portion of the corresponding filter bed are not a "plenum" as that term is used herein. "Cone shaped" as used herein includes within its definition pyramidal shaped objects.

FIGS. 1 to 10

Referring to FIGS. 1 to 10, a first preferred embodiment of the present invention will now be described. This embodiment employs five different types of fluid distribution members 2, 4, 6, 8, and 10. Each of the fluid distribution members 2, 4, 6, 8, and 10 have at least on hydraulic characteristic that differs from the other types of fluid distribution members. In this embodiment, the at least one different hydraulic characteristic is the different sizes of the control orifices 12, 14, 16, 18, and 20. Control orifice 12 has a diameter of 9/16 inches. Control orifice 14 has a diameter of 19/32 inches. Control orifice 16 has a diameter of 5/8 inches. Control orifice 18 has a diameter of 41/64 inches. Control orifice 20 has a diameter of 11/16 inches.

By varying the size of the control orifices 12, 14, 16, 18, and 20 this embodiment of the present invention is able to readily compensate for pressure differences across the plenum A formed below the Wheeler bottom underdrain B. A filter bed (not shown) is supported above the Wheeler bottom underdrain B by a plurality of piers C. Plenum A extends below substantially the entirety of the filter bed.

By compensating for the pressure differences across plenum A, the present invention is able to eliminate or substantially reduce maldistribution of a fluid passing from plenum A through fluid distribution members 2, 4, 6, 8, and 10 to the filter bed. As such, this embodiment of the present invention is able to achieve a more thorough and hence more effective cleaning of the filter bed when a washing liquid (e.g., filtered or unfiltered water) and/or gas (e.g., gas) is distributed in a substantially uniform manner throughout all portions of the filter bed. This embodiment is also able to achieve a more effective filtering of influent as the influent will be distributed in a uniform manner throughout all portions of the filter bed.

The corrective impact that varying the size of the control orifices of fluid distribution members 2, 4, 6, 8, and 10 has on pressure variances across a plenum and the corresponding maldistribution can be seen from the following example.

Example A

Assume the following conditions exist: (i) an existing filter with a monolithic Wheeler bottom underdrain system; (ii) a design backwash flow rate of 20 m/ft² of filter area; (iii) plenum pressures at 20 gpm/ft² have been measured at various locations across the filter varying from 3.6 ft at the lowest to 5.6 ft. at the highest; (iv) a control orifice diameter of 0.75 in.; and, (v) the discharge coefficient of the control orifice is 0.95.

Flow thru an orifice can be determined by the following well known equation:

$$Q = 19.636 C d \sqrt{h}$$

Where Q=flow thru the orifice in gpm, C=the orifice discharge coefficient (dimensionless), d=the diameter of the orifice in inches and h=the headloss across the orifice in ft. water column This equation may be rearranged to solve for the orifice diameter d, as follows:

$$d = \left[ \frac{Q}{19.636 C \sqrt{h}} \right]^{1/2}$$

Knowing the desired flow rate through each of the orifices (in most cases it will be desired to have substantially the same flow rate through each of the control orifices of the distribution members 2, 4, 6, 8, and 10) and the available head, the diameter of the control orifice can be determined by substituting in the applicable values. For the highest pressure measured of 5.6 ft., $$d = \left[ \frac{20 \; gpm}{19.636 * .95 \sqrt{5.6 \; ft}} \right]^{1/2} = \ldots {}_6 7 \; in \; dia.$$

Therefore, a control orifice with a diameter of 0.67 in. can be installed in the areas of highest pressure to equalize the flow rate with the flow rate through the control orifice having a diameter of 0.75 inches at the lowest pressure measured at 3.6 ft. The same method can be used to determine the required control orifice diameter for any pressure in the plenum.

While five different sizes of control orifices are used in this embodiment, it will be readily appreciated that the number of different control orifices may be more or less depending upon the characteristics of the filter.

Fluid distribution members or inserts 2, 4, 6, 8, and 10 are preferably formed from plastic and configured to be readily inserted from above underdrain B into the cone-shaped depressions 22 formed in a typical wheeler bottom underdrain B. It should be noted that the underdrain could be monolithic or precast. The underdrain B as shown herein is formed of concrete. However, it will be readily appreciated that any suitable material may be used. Further, the present invention is not limited to being used with wheeler bottom underdrains. Rather, the present invention can be used with any suitable underdrain including but not limited to plenum type underdrains (e.g., e.g., Wheeler bottoms, nozzle bottoms, strainers, Hydrocones, etc.)

Figure 6:
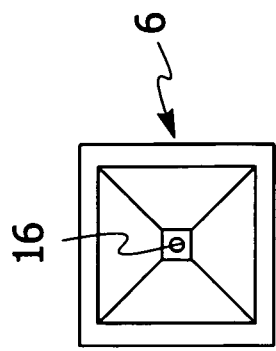
FIG. 6 is a plan view of one type of distribution member illustrated in FIG. 1 having a control orifice of 5/8 inches in diameter. This distribution member corresponds to the color red in the legend depicted in FIG. 2.
Figure 8:
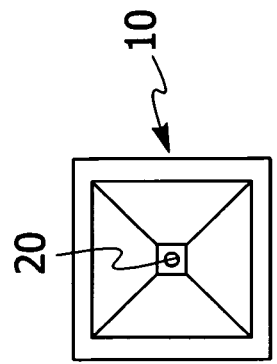
FIG. 8 is a plan view of one type of distribution member illustrated in FIG. 1 having a control orifice of 11/16 inches in diameter. This distribution member corresponds to the color yellow in the legend depicted in FIG. 2.
Figure 5:
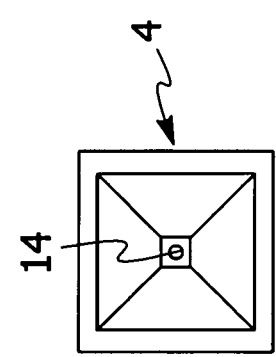
FIG. 5 is a plan view of one type of distribution member illustrated in FIG. 1 having a control orifice of 19/32 inches in diameter. This distribution member corresponds to the color purple in the legend depicted in FIG. 2.
Figure 4:
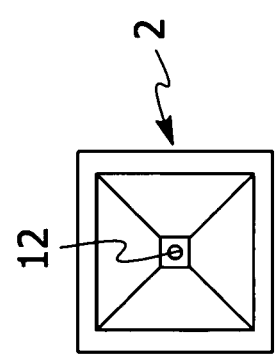
FIG. 4 is a plan view of one type of distribution member illustrated in FIG. 1 having a control orifice of 9/16 inches in diameter. This distribution member corresponds to the color green in the legend depicted in FIG. 2.
Figure 7:
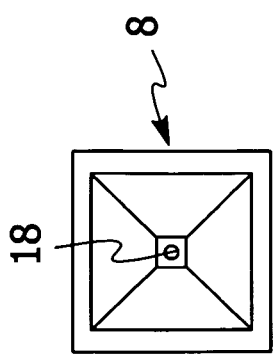
FIG. 7 is a plan view of one type of distribution member illustrated in FIG. 1 having a control orifice of 41/64 inches in diameter. This distribution member corresponds to the color blue in the legend depicted in FIG. 2.
Figure 9:
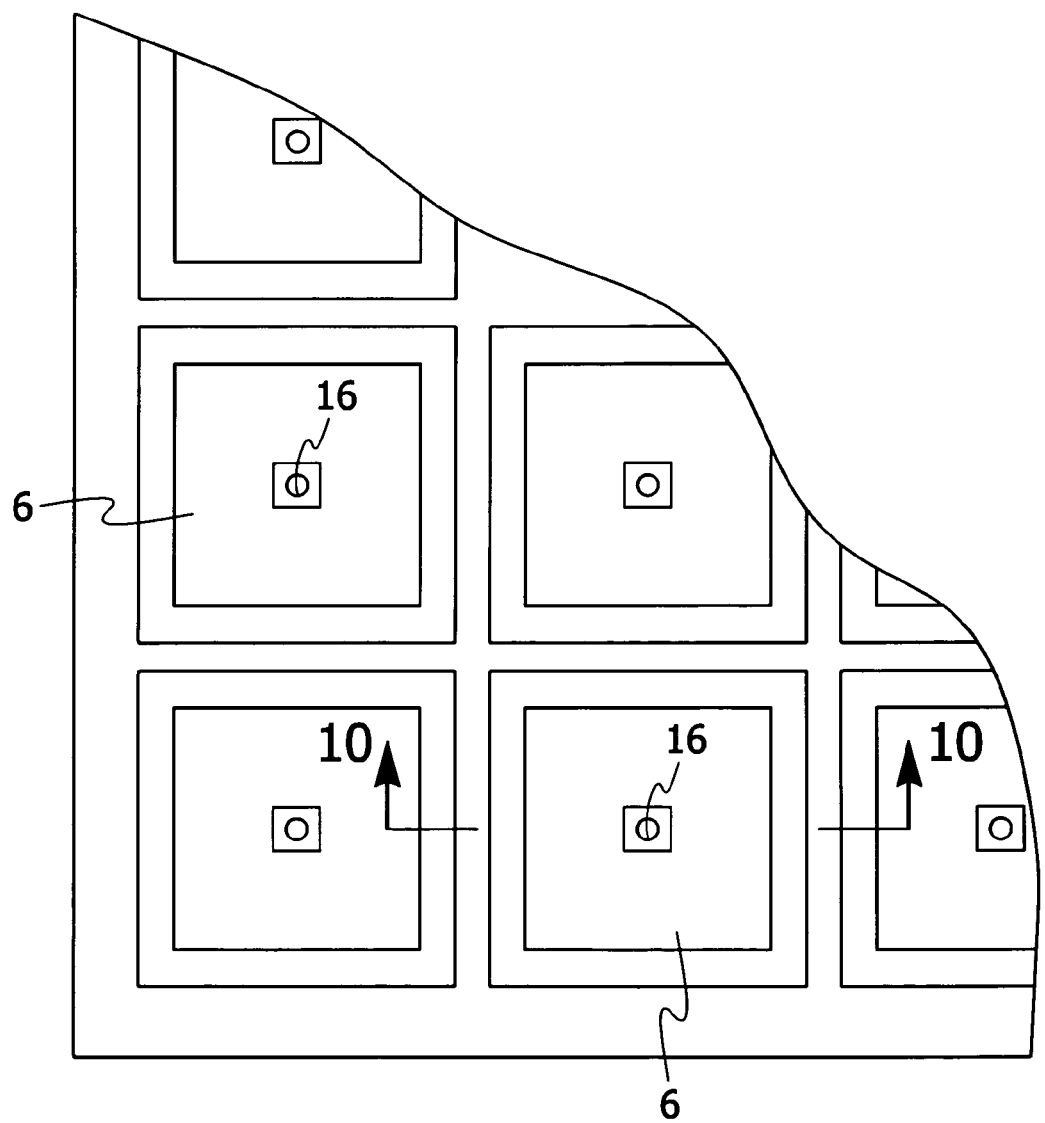
FIG. 9 is a fragmentary plan view of a portion of a Wheeler bottom type filter.
Figure 10:
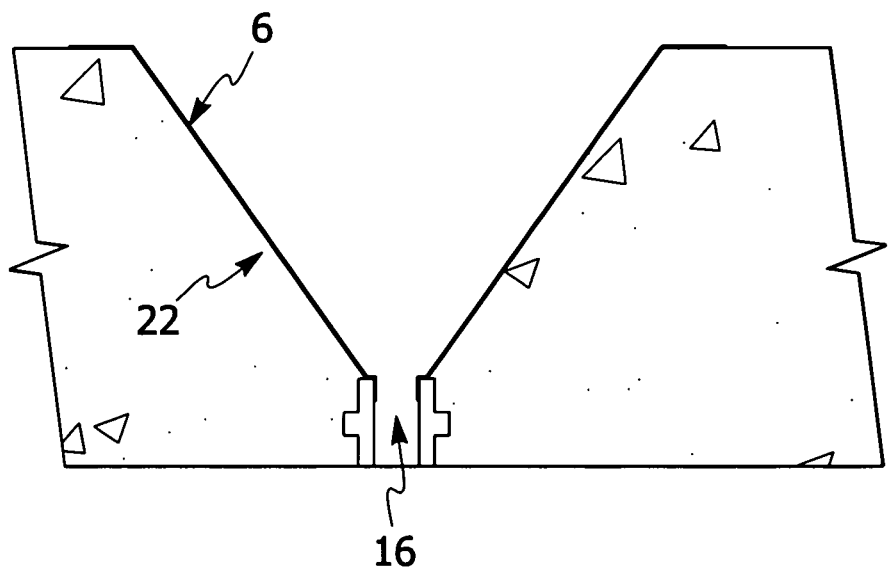
FIG. 10 is cross-sectional view taken along lines 10-10 in FIG. 9.

In the most preferred embodiment, the fluid distribution members 2, 4, 6, 8, and 10 are color coded inserts so that an individual can readily ascertain where a particular type of fluid distribution member is to go. Referring to FIGS. 1, 2 and 8, yellow would identify a fluid distribution insert 10 whose control orifice 20 is ¹¹⁄₁₆ in. Referring to FIGS. 1, 2 and 7, blue would identify a fluid distribution insert 8 whose control orifice 18 is ⁴¹⁄₆₄ in. Referring to FIGS. 1, 2 and 6, red would identify a fluid distribution insert 6 whose control orifice 16 is ⅝ in. Referring to FIGS. 1, 2 and 5, purple would identify a fluid distribution insert 4 whose control orifice 14 is ¹⁹⁄₃₂ in. Referring to FIGS. 1, 2 and 4, green would identify a fluid distribution insert 2 whose control orifice 12 is ⁹⁄₁₆ in. Knowing the pressure variances in the plenum A from performing a suitable analysis of the plenum A, a profile can be created identifying which colored insert is to go where in a given filter. Using the generated profile, an individual can readily ascertain where each different fluid distributor is to be located in a given filter. The profile could be of the form depicted in FIG. 1. If the profile is similar to that depicted in FIG. 1, an individual would know that yellow colored fluid distributors are to be placed adjacent influent inlet D. It should be noted that the profile could be in electronic form or hard copy.

It should be further noted that the present invention is not limited to the color scheme disclosed herein. Rather, any suitable color scheme could be used. Further, the present invention is not limited to colors but could be any suitable identifying indicia including numbers, symbols, letters, etc. It will be appreciated that the aforementioned identifying indicia scheme is optional.

FIGS. 11 to 14

Referring to FIGS. 11 to 14, two alternative embodiments are illustrated that utilize varying sizes of control orifices to compensate for pressure differences in plenum A to reduce or eliminate maldistribution of one or more fluids through a granular media filter bed.

Figure 11:
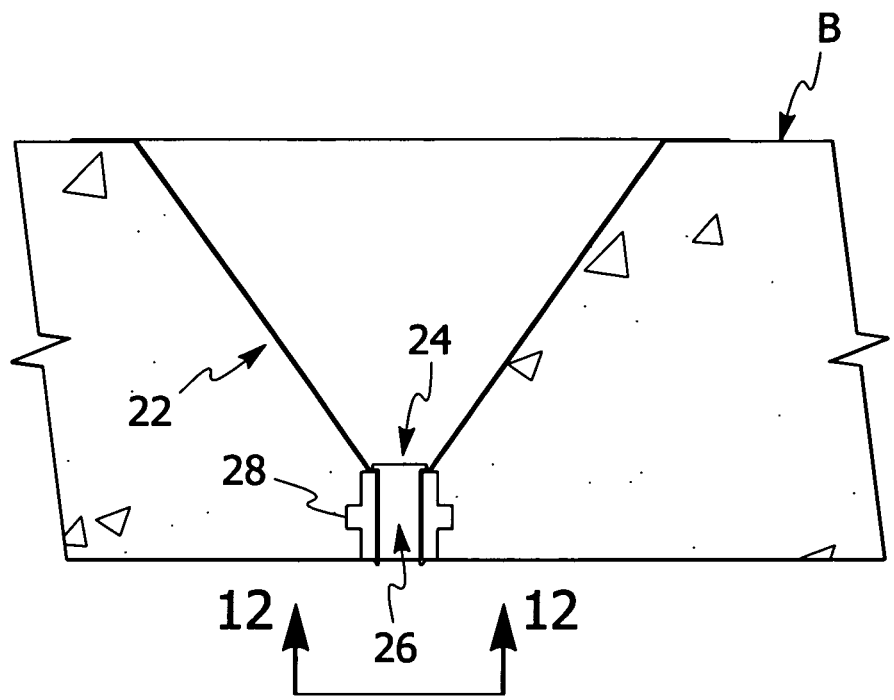
FIG. 11 is a fragmentary cross-sectional of an alternative embodiment of the present invention.
Figure 12:
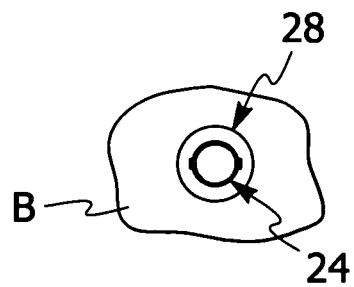
FIG. 12 is a fragmentary bottom view from the perspective of lines 12-12 in FIG. 11.

Referring to FIGS. 11 and 12, this embodiment utilizes a plurality of generally cylindrical inserts 24 that have a bore 26 extending therethrough to allow a fluid to pass through each of the inserts 24. As seen in FIG. 11, inserts 24 are preferably configured to be inserted in a conventional thimble 28 of a Wheeler bottom underdrain B. By varying the diameter of bore 26, the size of a control orifice can be readily varied. The diameters of the bores 26 may correspond to the orifices sizes of inserts 2, 4, 6, 8 and 10. However, it will be readily appreciated that the number inserts having different size bores as well as the particular sizes of the bores may be varied as desired.

Figure 13:
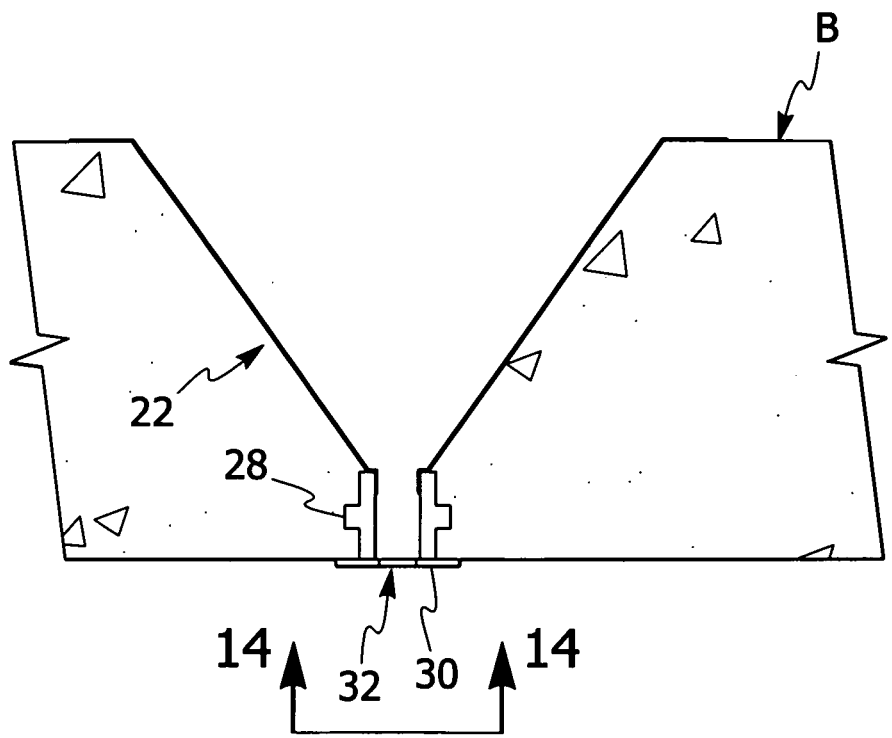
FIG. 13 is a fragmentary cross-sectional of another alternative embodiment of the present invention.
Figure 14:
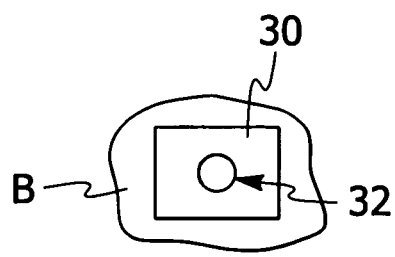
FIG. 14 is a fragmentary bottom view from the perspective of lines 14-14 in FIG. 13.

Referring to FIGS. 13 and 14, this embodiment utilizes a plurality of plates 30 that have a control orifice 32 formed therein. As seen in FIG. 13, plates 32 are preferably disposed below a conventional thimble 28 of a wheeler bottom underdrain B. By varying the diameter of control orifices 32, pressure differences across the plenum can be readily compensated for. The diameters of the control orifices 32 may correspond to the orifices sizes of inserts 2, 4, 6, 8 and 10. However, it will be readily appreciated that the number plates having different size control orifices as well as the particular sizes of the control orifices may be varied as desired.

FIGS. 15 to 18

Referring to FIGS. 15 to 18, three further alternative embodiments of the present invention are illustrated. As opposed to utilizing a control orifice to compensate for pressure differences in plenum A, these embodiments utilize differences in discharge coefficients to compensate for pressure differences across plenum A. However, it will be readily appreciated that both control orifice sizes and discharge coefficients may be used in the same embodiment to compensate for pressure variances across a plenum.

Figure 15:
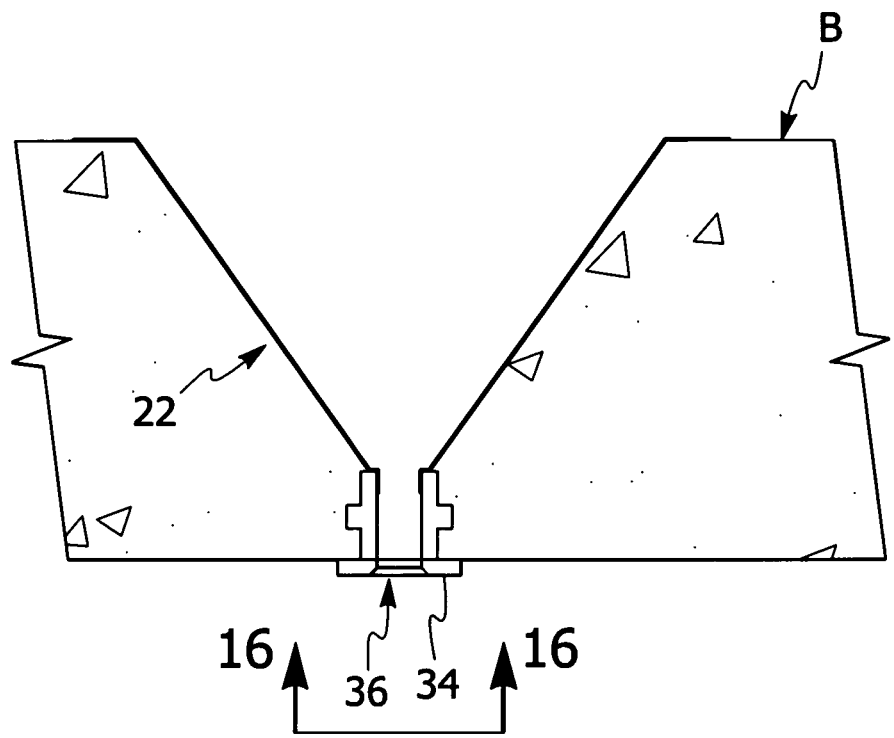
FIG. 15 is a fragmentary cross-sectional of a further alternative embodiment of the present invention.
Figure 16:
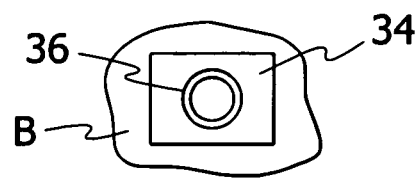
FIG. 16 is a fragmentary bottom view from the perspective of lines 16-16 in FIG. 15.

Referring to FIGS. 15 and 16, this embodiment employs a plurality of plates 34 preferably disposed below the generally cone-shaped depressions 22 formed in underdrain B. As seen in FIGS. 15 and 16, plate 34 has a tapered opening 36. By varying the degree of tapering including no taper between the numerous plates 34 used in any given installation, the discharge coefficient can be readily varied among the numerous plates 34 to compensate for variances in pressure across plenum A.

Figure 17:
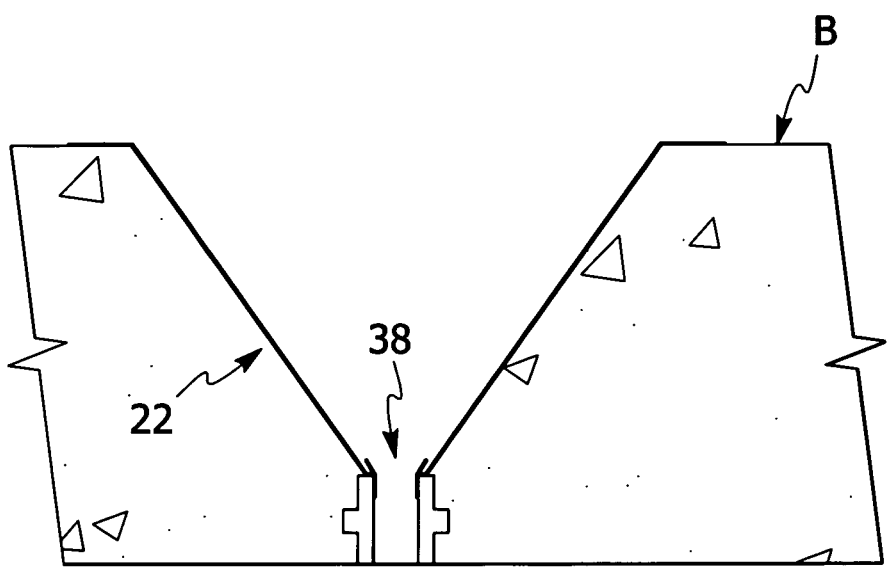
FIG. 17 is a fragmentary cross-sectional view of yet a further alternative embodiment of the present invention.

Referring to FIG. 17, a plurality of tapered nozzles 38 are preferably disposed in the generally cone-shaped depressions 22. By varying the degree of tapering including no taper between the nozzles 38 used in any given installation, the discharge coefficient can be readily varied among the nozzles 38 to compensate for variances in pressure across plenum A.

Figure 18:
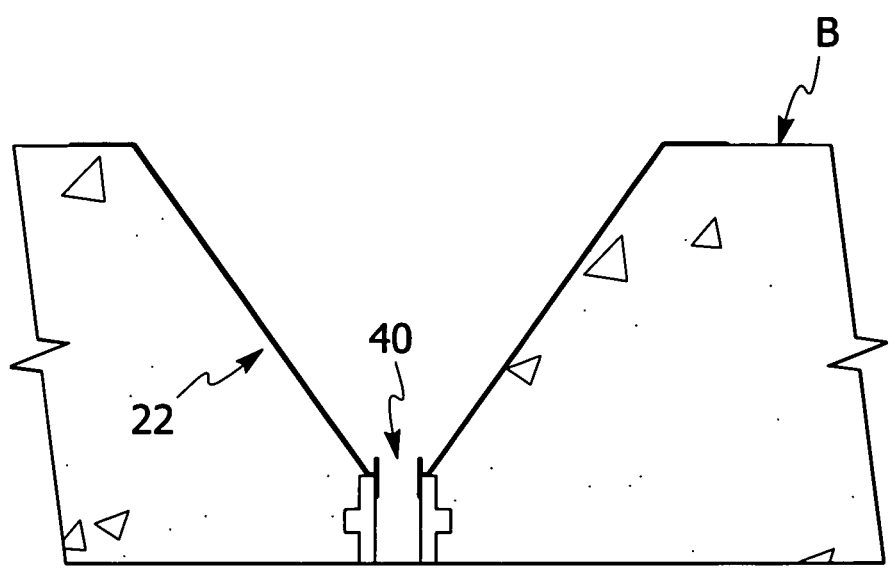
FIG. 18 is a fragmentary cross-sectional of yet still another alternative embodiment of the present invention.

Referring to FIG. 18, a plurality of extension nozzles 40 are used to compensate for pressure variances in plenum A. By varying the height of the extension nozzles 40 between the numerous nozzles 40 installed across the underdrain B, the discharge coefficient can be readily varied among the numerous nozzles 40 across the underdrain B to compensate for variances in pressure across plenum A.

FIGS. 19 to 22

Figure 19:
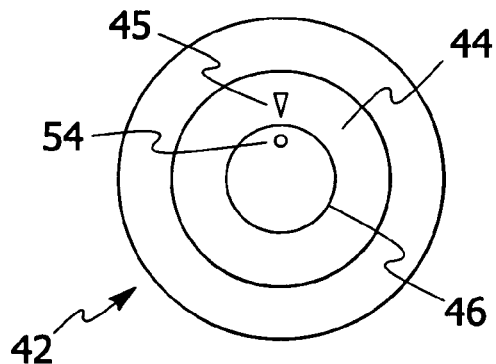
FIG. 19 is a plan view of a distribution formed in accordance with yet still a further embodiment of the present invention.
Figure 21:
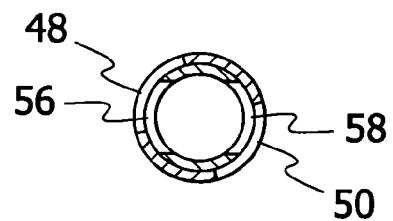
FIG. 21 is a cross-sectional view of the embodiment illustrated in FIG. 19 where the cross-section is taken along lines 21-21 in FIG. 22.
Figure 20:
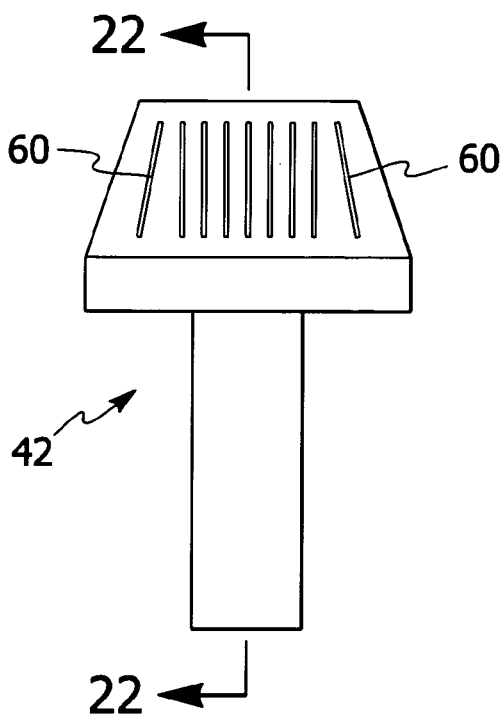
FIG. 20 is an elevation view of the embodiment illustrated in FIG. 19.
Figure 22:
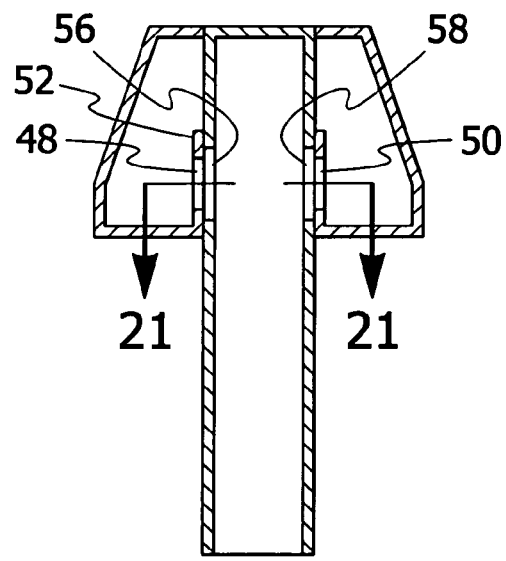
FIG. 22 is a cross-sectional view of the embodiment illustrated in FIG. 19 where the cross-section is taken along lines 22-22 in FIG. 20.

Referring to FIGS. 19 to 22, a further alternative embodiment is illustrated. In this embodiment, the fluid distributor is a nozzle or strainer 42. This embodiment allows for one or more hydraulic characteristics of the nozzle or strainer 42 to be readily varied. Nozzle 42 includes a strainer cap 44 and a strainer stem 46. Stem 46 is configured to rotate relative to cap 44. As illustrated in FIG. 19, cap 44 includes an orientation mark 45 identifying the location of two oppositely disposed openings 48 and 50 formed in an inner annular wall portion 52. Stem 46 includes an orientation mark 54 identifying the location of two oppositely disposed openings 56 and 58 formed in a hollow annular stem 46. As seen in FIG. 21, by rotating stem 46 relative to cap 44 such that the orientation marks 45 and 54 are no longer aligned, one can vary the size of openings 48 and 50 and hence the flow rate of a fluid through slits 60 which allow a fluid to pass from a plenum A through nozzles 42 into the filter bed. In this manner, one can readily compensate for pressure variances across plenum A.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for filtering water or wastewater, said apparatus comprising:
   (a) an underdrain for directing fluids into a filter bed;
   (b) a first distribution member operably associated with said underdrain through which one or more fluids pass in route to the filter bed, said first distribution member having only a single opening passing therethrough, said first distribution member having a first hydraulic characteristic, said first distribution member including identifying indicia corresponding to said first hydraulic characteristic to identify to an individual a first operating location for said first distribution member; and,
   (c) a second distribution member operably associated with said underdrain through which one or more fluids pass in route to the filter bed, said second distribution member having only a single opening passing therethrough, said second distribution member having a second hydraulic characteristic, said second hydraulic characteristic being different from said first hydraulic characteristic, said second distribution member having a second identifying indicia for identifying to an individual a second operating location for said second distribution member, said first identifying indicia being different from said second identifying indicia and said first operating location being different from said second operating location.

2. An apparatus, as set forth in claim 1, wherein:
   (a) said first distribution member and said second distribution member are fixed relative to said underdrain.

3. An apparatus as set forth in claim 1, wherein:
   (a) said first distribution member is an insert extending into at least a portion of said underdrain; and,
   (b) said second distribution member is an insert extending into at least a portion of said underdrain.

4. An apparatus as set forth in claim 3, wherein:
   (a) said first distribution member and said second distribution member are generally cone shaped; and,
   (b) said underdrain having first and second generally cone-shaped depressions, said first distribution member is inserted into said first generally cone shaped depression and said second distribution member is inserted into said second generally cone-shaped depression.

5. An apparatus as set forth in claim 4, wherein:
   (a) said first distribution member has a first control orifice, said second distribution member has a second control orifice, said first control orifice is greater in size than said second control orifice.

6. An apparatus as set forth in claim 3, wherein:
   (a) said first distribution member and said second distribution member have a substantially cylindrical configuration.

7. An apparatus as set forth in claim 6, wherein:
   (a) said first distribution member has a first control orifice, said second distribution member has a second control orifice, said first control orifice is greater in size than said second control orifice.

8. An apparatus for filtering water or wastewater, said apparatus comprising:
   (a) an underdrain for directing fluids into a filter bed;
   (b) a first distribution member operably associated with said underdrain through which one or more fluids pass in route to the filter bed, said first distribution member having a first hydraulic characteristic, said first distribution member including identifying indicia corresponding to said first hydraulic characteristic to identify to an individual a first operating location for said first distribution member; and,
   (c) a second distribution member operably associated with said underdrain through which one or more fluids pass in route to the filter bed, said second distribution member having a second hydraulic characteristic, said second hydraulic characteristic being different from said first hydraulic characteristic, said second distribution member having a second identifying indicia for identifying to an individual a second operating location for said second distribution member, said first identifying indicia being different from said second identifying indicia and said first operating location being different from said second operating location, said first identifying indicia is a first color and said second identifying indicia is a second color, said first color is different from said second color.

9. An apparatus for filtering water or wastewater, said apparatus comprising:
   (a) an underdrain for supporting a filter bed having at least one layer of filter media;
   (b) a plurality of distribution members operably associated with said underdrain, each of said plurality of distribution members being configured to permit a fluid to pass therethrough in route to the filter bed, each of said plurality of distribution members having at least one different hydraulic characteristic for minimizing maldistribution of a fluid through the filter bed, each of said plurality of distribution members having only a single opening extending therethrough to permit a fluid to pass therethrough in route to the filter bed; and,
   (b) a plenum operably associated with said underdrain, said plenum being configured to direct a fluid into each of said plurality of distribution members.

10. An apparatus as set forth in claim 9, wherein:
    (a) each of said plurality of distribution members is an insert, each of said plurality of inserts extend into said underdrain.

11. An apparatus as set forth in claim 10, wherein:
    (a) said underdrain includes a plurality of generally cone shaped depressions, each of said plurality of inserts extend into one of said plurality of generally cone shaped depressions.

12. An apparatus as set forth in claim 11, wherein:
(a) each of said plurality of inserts have a substantially cylindrical configuration.

13. An apparatus as set forth in claim 12, wherein:
(a) each of said plurality of inserts are generally cone shaped.

14. An apparatus as set forth in claim 13, wherein:
(a) each of said plurality of inserts has a control orifice disposed between an uppermost portion of said underdrain and a lowermost portion of said underdrain.

15. An apparatus for filtering water or wastewater, said apparatus comprising:
(a) a fluid distribution chamber for receiving and distributing one or more fluids;
(b) an underdrain operably associated with said fluid distribution chamber for directing a washing liquid from said fluid distribution chamber into a filter bed, said underdrain including a plurality of fluid passageways through which the washing liquid from said fluid distribution chamber passes in route to the filter bed; and,
(c) a plurality of inserts, each of said inserts being configured to be inserted into at least a portion of one of said plurality of fluid passageways, each of said plurality of inserts having a control orifice through which the washing liquid from said fluid distribution chamber passes in route to the filter bed, at least one of said plurality of inserts has a control orifice of a size different from a control orifice of at least one other of said plurality of inserts to reduce maldistribution of the washing liquid during washing of the filter bed, said control orifice of each of said plurality of inserts is the only orifice that extends through each of said plurality of inserts.

16. An apparatus as set forth in claim 15, wherein:
(a) each of said plurality of inserts have a substantially cylindrical configuration.

17. An apparatus as set forth in claim 15, wherein:
(a) each of said plurality of inserts are generally cone shaped.

18. An apparatus for filtering water or wastewater, said apparatus comprising:
(a) an underdrain for supporting a granular media filter bed;
(b) a first set of distribution members operably associated with said underdrain, said first set of distribution members including at least two distribution members, each of said distribution members in said first set of distribution members having a first hydraulic characteristic, each of said distribution members in said first set of distribution members is an insert having only a single opening extending therethrough, each of said inserts extending into a portion of said underdrain;
(b) a second set of distribution members operably associated with said underdrain, said second set of distribution members including at least two distribution members, each of said distribution members in said second set of distribution members having a second hydraulic characteristic, each of said distribution members in said second set of distribution members is an insert having only a single opening extending therethrough, each of said inserts extending into a portion of said underdrain; and,
(c) a plenum operably associated with said underdrain, said plenum being configured to direct a fluid into each of said distribution members in said first set of distribution members and said second set of distribution members, said second hydraulic characteristic being different from said first hydraulic characteristic to compensate for pressure differences in said plenum adjacent said first set of distribution members and said second set of distribution members.

19. An apparatus as set forth in claim 18, wherein:
(a) said underdrain includes a plurality of generally cone shaped depressions;
(b) a thimble disposed in a lower portion of each of said generally cone shaped depressions; and,
(c) each of said plurality of inserts of said first set of distribution members extend into a corresponding thimble.

20. An apparatus as set forth in claim 19, wherein:
(a) each of said distribution members in said second set of distribution members is an insert that extends into a corresponding thimble.

21. An apparatus as set forth in claim 18, wherein:
(a) each of said distribution members in said first set of distribution members has a first control orifice of a first size; and,
(b) each of said distribution members in said second set of distribution members has a second control orifice of a second size, said second size being greater than said first size to compensate for pressure differences in said plenum adjacent said first set of distribution members and adjacent said second set of distribution members.

22. An apparatus as set forth in claim 21, wherein:
(a) each of said first control orifices and each of said second control orifices are disposed between an uppermost portion and a lowermost portion of said underdrain.

23. An apparatus as set forth in claim 22, wherein:
(a) said underdrain having a plurality of generally cone shaped depressions; and
(b) each of said distribution members in said first set of distribution members and said second set of distribution members are generally cone shaped and extend into a corresponding one of said plurality of generally cone shaped depressions.

24. An apparatus for filtering water or wastewater, said apparatus comprising:
(a) an underdrain for supporting a granular media filter bed;
(b) a first set of distribution members operably associated with said underdrain, said first set of distribution members including at least two distribution members, each of said distribution members in said first set of distribution members having a first hydraulic characteristic;
(c) a second set of distribution members operably associated with said underdrain, said second set of distribution members including at least two distribution members, each of said distribution members in said second set of distribution members having a second hydraulic characteristic;
(c) a plenum operably associated with said underdrain, said plenum being configured to direct a fluid into each of said distribution members in said first set of distribution members and said second set of distribution members, said second hydraulic characteristic being different from said first hydraulic characteristic to compensate for pressure differences in said plenum adjacent said first set of distribution members and said second set of distribution members;
(e) at least a portion of each of said distribution members in said first set of distribution members having a first color corresponding to a first operating position for each of said distribution members in said first set of distribution members; and, (f) at least a portion of each of said distribution members in said second set of distribution members having a second color corresponding to a second operating position for said distribution members in said second set of distribution members, said first operating position being different from said second operating position.

25. A system for use with a filter having a filter bed that is periodically subjected to fluids including a liquid, a gas and/or a combination of liquid and gas; said system comprising:
   (a) a plenum for receiving and distributing one or more fluids, said plenum including an inlet for receiving one or more fluids;
   (b) an underdrain, disposed above said plenum, for supporting a filter bed having at least one layer of filter media, said underdrain including at least one opening for receiving one or more fluids from said plenum; and,
   (c) a distribution member fixed relative to said underdrain such that said distribution member does not move relative to said underdrain, said distribution member being configured to vary a hydraulic characteristic of said opening in said underdrain to compensate for pressure variances in said plenum, said distribution member being disposed entirely within said plenum.

26. A system as recited in claim 25, wherein:
   (a) said distribution member is a plate having a control orifice.

27. A system as recited in claim 26, wherein:
   (a) said control orifice is tapered.

\* \* \* \* \*